(12) United States Patent
Visser

(10) Patent No.: US 11,116,138 B2
(45) Date of Patent: Sep. 14, 2021

(54) BALE FORMING AND WRAPPING APPARATUS AND METHOD WITH A PIVOTAL WEB PUSHER

(71) Applicant: LELY FORAGE INNOVATIONS B.V., Maassluis (NL)

(72) Inventor: Arend Cornelis Visser, Maasland (NL)

(73) Assignee: FORAGE COMPANY BV, Maassluis (NL)

( * ) Notice: Subject to any disclaimer, the term of this patent is extended or adjusted under 35 U.S.C. 154(b) by 334 days.

(21) Appl. No.: 15/769,580

(22) PCT Filed: Oct. 18, 2016

(86) PCT No.: PCT/NL2016/050716
§ 371 (c)(1),
(2) Date: Apr. 19, 2018

(87) PCT Pub. No.: WO2017/078517
PCT Pub. Date: May 11, 2017

(65) Prior Publication Data
US 2018/0295780 A1  Oct. 18, 2018

(30) Foreign Application Priority Data

Nov. 2, 2015 (NL) ...................................... 2015709

(51) Int. Cl.
*A01F 15/07* (2006.01)
(52) U.S. Cl.
CPC ................................ *A01F 15/0715* (2013.01)

(58) Field of Classification Search
CPC ................ A01F 15/0715; A01F 15/071; A01F 2015/072; B65B 27/125; B65B 27/12
See application file for complete search history.

(56) References Cited

U.S. PATENT DOCUMENTS 4,296,595 A * 10/1981 Meiners ................ A01F 15/071
53/118
4,333,301 A * 6/1982 Koutonen ............... B65B 45/00
53/587

(Continued)

FOREIGN PATENT DOCUMENTS

EP  1808065 A1  7/2007
EP  2769615 A2  8/2014

OTHER PUBLICATIONS

European Patent Office, International Search Report for Priority Application No. NL 2015709, dated Sep. 15, 2016.

(Continued)

*Primary Examiner* — Thomas M Wittenschlaeger

(57) ABSTRACT

A bale forming and wrapping apparatus and method which forms a bale in a bale forming chamber. The bale in the bale forming chamber is wrapped by means of a wrapping device. A web of wrapping material is pulled from a reservoir which is held by an unrolling station. A wrapping material conveying device conveys the web towards a wrapping material inlet extending along an inlet longitudinal axis. A pusher plate drive pivots at least one pusher plate. The pivoted pusher plate hits the conveyed web and pushes the web towards the wrapping material inlet. The pusher plate pivoting axis is perpendicular to the inlet longitudinal axis, e.g. is vertical.

4 Claims, 8 Drawing Sheets

(56) References Cited

U.S. PATENT DOCUMENTS

| | | | | |
|---|---|---|---|---|
| 4,686,812 A * | 8/1987 | Bruer | A01F 15/0705 53/118 |
| 4,723,395 A * | 2/1988 | Koutonen | B65B 11/04 53/587 |
| 4,841,851 A * | 6/1989 | Quataert | A01F 15/0705 100/5 |
| 5,020,299 A * | 6/1991 | Underhill | A01F 15/0715 53/399 |
| 5,216,873 A * | 6/1993 | Ratzlaff | A01F 15/0715 53/118 |
| 5,243,806 A * | 9/1993 | Jennings | A01F 15/0715 53/118 |
| 5,557,906 A * | 9/1996 | Viaud | A01F 15/0715 53/118 |
| 5,581,973 A * | 12/1996 | Underhill | A01F 15/0715 53/118 |
| 6,886,307 B2 * | 5/2005 | Viaud | A01F 15/0715 53/118 |
| 6,971,220 B1 * | 12/2005 | Rampp | A01F 15/071 53/216 |
| 7,322,167 B2 * | 1/2008 | Chapon | A01F 15/0715 53/118 |
| 7,644,563 B2 * | 1/2010 | De Gersem | A01F 15/0715 53/118 |
| 7,908,822 B2 * | 3/2011 | McClure | A01F 15/0715 242/535.1 |
| 8,434,289 B2 * | 5/2013 | Smith | A01F 15/0715 53/505 |
| 8,656,686 B2 * | 2/2014 | Smith | A01F 15/0715 53/216 |
| 9,010,071 B2 * | 4/2015 | Claeys | A01F 15/0715 100/5 |
| 9,149,003 B2 * | 10/2015 | Chapon | A01F 15/0715 |
| 9,474,212 B2 * | 10/2016 | Paillet | A01F 15/0715 |
| 10,375,893 B2 * | 8/2019 | Rosseel | B65B 11/04 |

OTHER PUBLICATIONS

European Patent Office, International Search Report for International Application No. PCT/NL2016/050716, dated Feb. 8, 2017.

* cited by examiner

BALE FORMING AND WRAPPING APPARATUS AND METHOD WITH A PIVOTAL WEB PUSHER

FIELD OF THE INVENTION

The invention refers to a bale forming and wrapping apparatus (baler) and a bale forming and wrapping method for forming in a bale forming chamber at least one bale from loose material and wrapping a surface of this bale in the chamber, in particular for forming a round-cylindrical bale from loose agricultural crop material (round baler) and wrapping its circumferential surface in the bale forming chamber.

The baler forms under pressure the bale in the bale forming chamber and ejects the formed bale out of the bale forming chamber. For preventing the ejected bale from falling apart, at least some parts of the bale surface are wrapped while the bale is still in the bale forming chamber and before the baler ejects the bale, e.g. the circumferential surface of a round-cylindrical bale.

For wrapping the bale a web of wrapping material has to be injected through a wrapping material inlet into the bale forming chamber. A reservoir for the web is positioned outside of the bale forming chamber. In particular if the baler belongs to an agricultural vehicle which is moved over ground some impacts like dirt, wind, and the inclination of the vehicle may disturb the injection of the web. Several approaches how to shift the web towards the wrapping material inlet have been published.

BACKGROUND OF THE INVENTION

EP 1808065 B1 discloses a round baler 200 which forms a round-cylindrical bale 400 in a pressing chamber 202, cf. FIG. 1. The bale 400 is wrapped in the pressing chamber 202 into a web 1 of wrapping material. The web 1 is pulled from a supply reel 10 by means of two rollers 21 and 22 which clamp and convey the web 1, cf. FIG. 2. The web 1 is further moved towards a wrapping material inlet 5. For doing so, a plate 31 mounted on arms 32 is moved from a remote position 6 into a position near the wrapping material inlet 5, cf. FIG. 2. In this position near the inlet 5 the front edge of the plate 31 engages into the inlet 5. This plate 31 can have a serration at the front end to allow the wrapping material 1 to get caught in correspondence of a set of teeth, cf. par. [0062]. In the embodiment a net 1 is used as the web of wrapping material. When be moved towards the inlet 5, the plate 31 catches and tensions the net 1. After the net 1 has been injected into the pressing chamber 202, the plate 31 supports from below the injected net 1.

EP 2769615 A2 discloses a round baler which forms a round bale in a pressing chamber and wraps the round bale B in the pressing chamber into a web of wrapping material WM. The wrapping material WM may be a twine, a pre-fabricated net made of twine, or a plastic sheet, cf. par. [0061]. The web is pulled from a supply reel RL by means of two driven pulling rollers S.1, S.2. A sagging loose front portion LEA is formed. The web has to be injected into the pressing chamber through an inlet N.1. A pusher plate Pl.PU is linearly moved towards the inlet N.1 and hits laterally the loose front portion LEA, cf. FIG. 3. The front edge PLE of the pusher plate Pl.PU hits the loose front portion LEA and forms a bulge Bu, cf. FIG. 3. In one embodiment this front edge PLE has several protrusions such that the front edge has the shape of a comb or a fork, cf. par. [0092].

U.S. Pat. No. 6,886,307 B2 discloses a round baler 10 which forms a round bale 32 in a baling chamber 18. An enveloping arrangement (wrapping device) 28 wraps the circumferential surface of the formed bale 32 in the pressing chamber into enveloping material 34. A feed roll 40 pulls the enveloping material 34 from a supply reel 54 and tensions the enveloping material 34. The enveloping arrangement 28 further comprises a guide arrangement 42 and a withdrawal arrangement 44. The guide arrangement 42 comprises two arms 56 and a contact plate 60 mounted at the lower free ends of the arms 56. The contact plate 60 forms a part of a cut-off arrangement 94. The withdrawal arrangement 44 comprises two arms 62 and a sheet metal driver 64, cf. FIG. 4 and FIG. 5. The sheet metal driver 64 has a serrated front edge 72, cf. FIG. 4 and FIG. 5. The front edge 72 of the sheet metal driver 64 is serrated and points towards the contact plate 60. The arm 62 can pivot around an axis 66 defined by bearings, cf. FIG. 2 to FIG. 5. When starting the bale wrapping, the guide arrangement 42 pivots downwards and moves the contact plate 60 away from the serrated front edge 72 of the sheet metal driver 64. The withdrawal arrangement 44 is also pivoted. At the same time the web 34 is injected into the bale chamber. Later the front edge 72 presses the web 34 against the surface of the contact plate 60 and produces a tension which severs the web 34.

U.S. Pat. No. 5,557,906 discloses a round baler 10 which forms a round bale 16 in a baling chamber 12. By means of a wrapping arrangement 14 the bale 16 in the baling chamber 12 is wrapped into wrap material 18. Possible kinds of wrap material 18 are plastic sheet, netting, fabric, paper, cf. col. 2/l.28-32. A pair of feet rollers 24 pulls the web 18 from a supply reel 31, cf. FIG. 1. A guide pan 29 with a curved forward section 33 guides the web 18 towards the wrapping material inlet. A spring 46 connects the guide pan 29 with supporting arms 35 of a cutting assembly. The guide pan 29 can thereby be pivoted between a remote position (dotted lines in FIG. 1) and an operative position (solid lines). The guide pan 29 is guided by means of pins 42. FIG. 2 shows an alternative embodiment 29' of the guide pan 29 with a curved front section of the pan and a serrated front edge (notches 54 and 46).

U.S. Pat. No. 6,971,220 B1 discloses a round bale press with a film wrapping device. Several supporting rolls 18 are mounted in a receptacle box 21 and support a film roll 11 in the box 21. Two pivot arms 14 are mounted on a holding device 16 by means of two pintails 15, cf. FIG. 1. Two film edge constriction rollers 19 are mounted on the free front ends of the pivot arms 14. Two opposing rollers 6, 7 pull a web 12 of film from a film roll 11 which is guided between the rollers 19. FIG. 2 shows how the rollers 19 shift together the film web 12.

SUMMARY OF THE INVENTION

The bale forming and wrapping apparatus according to the invention comprises
a bale forming means providing a bale forming chamber and
a wrapping device.

The wrapping device is positioned outside of the provided bale forming chamber and comprises
an unrolling station,
a wrapping material conveying device, and
at least one web pusher.

The or every web pusher comprises
a moveable pusher plate and
a pusher plate drive for moving this pusher plate.

A wrapping material inlet guides into the bale forming chamber. The wrapping material inlet extends along an inlet longitudinal axis.

The or at least one moveable pusher plate is pivotal around a plate pivoting axis. This plate pivoting axis is substantially perpendicular to the inlet longitudinal axis. The pusher plate drive for the pivotal pusher plate can pivot this pusher plate around the perpendicular plate pivoting axis towards the wrapping material inlet, thereby causing the pivotal pusher plate to push a web of wrapping material towards the wrapping material inlet.

The bale forming and wrapping method according to the invention is performed by using such a bale forming and wrapping apparatus.

The apparatus operates as follows and the method comprises the following steps:

The bale forming means forms a bale in the provided bale forming chamber.

The unrolling station holds at least one reservoir of wrapping material.

The wrapping material conveying device conveys a web of wrapping material towards the wrapping material inlet. The conveyed web is taken from the or one reservoir held by the unrolling station. The web is conveyed in a conveying direction towards the wrapping material inlet. At least in a final segment of the web path adjacent to the wrapping material inlet this conveying direction is perpendicular to the inlet longitudinal axis.

The or at least one pusher plate is moved towards the wrapping material inlet and hits the conveyed web. By hitting the conveyed web the moved pusher plate pushes the web towards the wrapping material inlet.

The conveyed and pushed web is injected through the wrapping material inlet into the bale forming chamber.

At least one surface of the bale in the bale forming chamber is wrapped into the injected web.

The conveyed web is pushed towards the wrapping material inlet as follows:

At least one pusher plate drive pivots the or one pusher plate around the respective plate pivoting axis towards the wrapping material inlet. This plate pivoting axis is perpendicular to the inlet longitudinal axis.

The pivoted pusher plate hits the web of wrapping material in a location between the wrapping material conveying device and the wrapping material inlet. Thereby the conveyed web is pushed by the pivoted pusher plate towards the wrapping material inlet.

Advantages

According to the invention the wrapping device is positioned outside of the bale forming chamber. Therefore it is easier to detect and remove a malfunction and to perform maintenance or repair work. As the unrolling station of the wrapping device is positioned outside of the bale forming chamber, it is easier to replace an empty wrapping material reservoir with a new one.

The wrapping material conveying device according to the invention can be implemented such that it comprises a driven web feeding roller or passive guiding sheet which shifts the web towards the wrapping material inlet. But thanks to the web pusher such a web feeding roller or guiding sheet is not necessary.

The moveable web pusher plate according to the invention has the following advantage over a web feeding roller: In general a roller can only rotate around its own center axis. The conveying distance is limited by the roller diameter. The or every web pusher plate, however, can move and shift the web over a larger distance towards the wrapping material inlet than a web feeding roller which only rotates around its own center axis. The pusher plate can have a sufficient distance to the plate pivoting axis. In addition the pivotal pusher plate provides a wrapping device with higher reliability, in particular in the case of injecting wrapping material with a high stiffness, e.g. plastic film. In particular the risk is minimized that the conveyed and pushed web misses the wrapping material inlet, e.g. due to environmental impacts, and cannot be injected into the bale forming chamber. A similar advantage occurs when a moveable pusher plate is compared with a guiding sheet: A passive guiding sheet can only move the web over a range which is limited by the extension of the guiding sheet itself.

Thanks to the web pusher it is not necessary to implement the wrapping material inlet at the top of the bale forming chamber and let the web drop from above into the bale forming chamber. When positioned at the top the wrapping apparatus and in particular the wrapping material inlet are subjected to dirt and rain. Thanks to the invention it is possible to position the wrapping material inlet laterally, e.g. at the front side or rear side of a vehicle comprising the baler. It is possible to mount a cover about the wrapping device.

According to the invention the wrapping device comprises a wrapping material conveying device and in addition at least one web pusher which is spaced apart from the wrapping material conveying device. Both parts can be adapted or even optimized for their respective tasks: The wrapping material conveying device has to move the web along a significant segment of the entire path from the reservoir to the wrapping material inlet. The web pusher has to push the conveyed web towards the wrapping material inlet which is in general a movement along a significantly shorter distance than the length of the significant segment.

The invention increases the reliability of injecting the web in particular when the web is a plastic film. Wrapping the bale surface in the bale forming chamber into a plastic film and not into a net requires only one kind of wrapping material also in that case that later the entire bale surface is to be wrapped into an impermeable sheet. The baler wraps a part of the bale surface into plastic sheet. A so-called baler-wrapper combination or a stand-alone wrapper wraps the entire surface of the bale after the partially wrapped bale is ejected out of the bale forming chamber. A plastic film serving as the web has a significantly higher stiffness than a net or several strands of twine, in particular if the plastic film is shifted together and is therefore wrinkled. Thanks to the movement of the web pusher plate the risk that the web is not injected into the bale forming chamber is in particular reduced if the web has relative high stiffness.

Several conventional balers comprise a pusher plate which is linearly moved towards the wrapping material inlet. The moving direction is perpendicular to the inlet longitudinal axis and is horizontal or is sloping downwards. Other conventional balers push the web by pivoting a pusher plate around a horizontal plate pivoting axis which is parallel to the inlet longitudinal axis and which is positioned angularly below the wrapping material inlet. Both embodiments require more space in the direction in which the pusher plate is moved—space for the pusher plate and space for moving the pusher plate towards the wrapping material inlet. In contrast the baler according to the invention pivots the or every pusher plate around a vertical or sloping pivoting axis which is perpendicular to the wrapping material inlet. The pivotal movement around an axis perpendicular or angular to the inlet longitudinal axis requires less space seen in the horizontal direction perpendicular to the inlet longitudinal axis than a linear movement or a conventional pivotal movement. In the case of a bale forming apparatus belonging to a vehicle less space in the travelling direction is required. In particular the reduced length makes it easier to move the vehicle along a curve, e.g. turning it on the headland.

In addition the invention reduces the risk of a jam. According to the invention at least one web pusher plate is pivotal around a plate pivoting axis which is perpendicular to the inlet longitudinal axis. Seen in the web conveying direction, i.e. in a direction perpendicular to the inlet longitudinal axis, the plate pivoting axis can be positioned beside the wrapping material inlet. A pusher plate which is linearly moved or which is pivoted around a horizontal pivoting axis towards the wrapping material inlet, however, is always positioned opposite and adjacent to the wrapping material inlet, i.e. the wrapping material inlet is between the bale forming chamber and the pusher plate in every position of the pusher plate. A pusher plate which can linearly be shifted or conventionally be pivoted is necessarily positioned angularly below the wrapping material inlet and below that path which the web takes on its way towards the wrapping material inlet. In a conventional baler debris or dirt which occurs adjacent to the wrapping material inlet may therefore accumulate on the pusher plate being in a parking position and may form an obstacle against injecting the web into the bale forming chamber. Before being pivoted towards the wrapping material inlet the or at least one pivotal pusher plate according to the invention, however, is positioned laterally besides the wrapping material inlet. No dirt or debris can accumulate on the pusher plate and in a position adjacent to the wrapping material inlet. In contrast the invention ensures that debris and dirt adjacent to the wrapping material inlet can freely drop.

As the pivotal pusher plate reduces the risk of a malfunction it is often possible that the same unrolling station selectively holds a reservoir of a first kind or of a second kind of wrapping material, e.g. selectively a plastic sheet reel or a net reel. The wrapping device can operate in the same way regardless of the kind of wrapping material used. It is also possible that the same bale forming and wrapping apparatus can be used with wrapping material with different parameters, e.g. different stiffness values. It is possible but thanks to the invention not necessary that an operator enters or a sensor automatically detects what kind of wrapping material which is currently used or a property of the wrapping material.

The invention can be implemented on an existing bale forming and wrapping apparatus. An existing wrapping material conveying device can further be used. Thanks to the vertical plate pivoting axis the available space often suffices to mount the pivotal web pusher at a proper place.

PREFERRED EMBODIMENTS

According to the invention the web is injected through the wrapping material inlet into the bale forming chamber. In one embodiment at least one surface of the bale in the bale forming chamber is wrapped, i.e. covered with the injected web. In the case of a round-cylindrical bale this surface is preferably the circumferential surface. In the case of a cuboid bale at least two opposing bale surfaces are covered. It is also possible that the entire bale surface is covered with the injected web while the bale is in the bale forming chamber.

According to the invention the or one pusher plate can be pivoted around a plate pivoting axis which is perpendicular to the inlet longitudinal axis. Preferably this pusher plate can be pivoted around a pusher plate trajectory which extends in a trajectory plane which is parallel to the inlet longitudinal axis—or the inlet longitudinal axis is in the plane of the pusher plate trajectory. The pusher plate drive pivots this pusher plate along the pusher plate trajectory. This embodiment enables a very easy mechanical construction. The trajectory plane is preferably perpendicular or angular to the or the respective plate pivoting axis.

It is also possible that the plate pivoting trajectory is curved and does not extend in a plane, e.g. forms a part of a helix around the plate pivoting axis. In this case the pivotal movement of the pusher plate around the plate pivoting axis comprises a movement parallel to this axis.

Preferably the or every pusher plate extends in a plane. In one embodiment the plane of the or one pivotal pusher plate is perpendicular to the plate pivoting axis. The front edge of the pivoted pusher plate hits the web. The web is hit in a small segment. The caused impact on the web can be located quite precisely.

It is also possible that the plate pivoting axis is within the plane in which the or one pusher plate extends or is parallel to this plane. The plate operates like a flap, e.g. like a wing of a door. The outer edge of the plate, i.e. that edge which has the largest distance to the pivoting axis, hits the web in a longer segment.

It is also possible that the plate plane is neither parallel nor perpendicular to the plate pivoting axis but is angular, i.e. an angle between 0 and 90 degrees occurs, e.g. an angle of 45 degrees.

A vertical or angular plate plane has the further advantage that the risk is further reduced that dirt or debris accumulates on the pusher plate. In contrast the dirt or debris drops or glides downwards.

Preferably the or at least one pivotal pusher plate comprises a serrated edge serving as one front edge or outer edge, i.e. as that edge which points towards the wrapping material inlet. When the pusher plate is pivoted around the perpendicular plate pivoting axis towards the wrapping material inlet, this serrated edge hits one surface of the conveyed web. The serration in the front edge reduces the risk that the conveyed web is hit by the pusher plate but slips from the pusher plate and is not properly conveyed and pushed towards the wrapping material inlet.

The front edge or outer edge of the or one pivotal pusher plate can form a straight line. It is also possible that the front edge is curved when seen in a direction perpendicular to the plate plane. Seen in a direction parallel to the plate plane the front edge can be convex.

In general the same baler subsequently forms and wraps several bales in the bale forming chamber. Preferably a segment of the web already taken from the reservoir is kept in a parking position without being moved after the previous bale has been wrapped and until the current bale has to be wrapped. When the web is kept in the parking position, a slack leading segment is formed. The term "leading" refers to the conveying direction of the web. The wrapping material conveying device conveys this leading segment towards the wrapping material inlet. Preferably this slack leading segment is so long that it suffices for injecting the web, i.e. the leading segment remains slack until the web has been injected into the bale forming chamber. This embodiment saves the need of pulling at the web until the web is injected. No further web needs to be taken from the reservoir until the web is injected. In addition the feature of conveying a slack leading segment inhibits the event that the or one moved pusher plate tensions the conveyed web. Such a tension may damage the web, in particular if the pusher plate has a serrated front edge and if the web is a plastic film. In addition the shift of a tensioned web requires more energy than the shift of a slack web as the web pusher does not have to surpass the web tension.

In one embodiment a touching part of the wrapping material conveying device touches the web. The touched web is moved towards the wrapping material inlet. In one implementation the touching part is itself moved and moves the touched web. The touching part can comprise two elements which clamp the web between them, e.g. two rollers wherein one roller is biased against the other roller and at least one roller is driven. The touching parts can also comprise two yaws of a moved duckbill. The touching part can also be a moved plate which carries the web.

In every implementation of the touching part the slack leading segment of the web protrudes from the touching part towards the wrapping material inlet. This leading segment is hit by the pivoted web pusher and injected through the wrapping material inlet into the bale forming chamber. Preferably the leading segment remains slack until being injected. Preferably the or one pivotal pusher plate hits the leading segment while the pusher plate is pivoted around the vertical axis. This movement causes the slack leading segment to be shifted towards the wrapping material inlet. Tilting a slack leading segment moves the web over a longer distance, requires less energy, and reduces the risk of damaging the web compared with hitting a tensioned leading segment.

In one embodiment the pusher plate extends in a plane which is perpendicular or angular to the web conveying direction. The location at which the pusher plate hits the web is positioned between the touching location and the front edge of the web. Preferably the web is slack and the pusher plate is pivoted so quickly that a bulge is formed in the web being hit by the pusher plate. The bulge comprises two layers of web and these two layers are inserted simultaneously through the wrapping material inlet into the bale forming chamber.

Preferably a severing device severs the web of wrapping material after the bale in the bale forming chamber is wrapped. The severing device severs the web at a severing location which is positioned between the touching location achieved by the touching part and the wrapping material inlet. The leading segment is formed after severing the web and extends from the touching location to the severing location.

In one embodiment the or at least one pivotal pusher plate has a rectangular shape seen in a direction perpendicular to the plate plane. In a further embodiment the or at least one pivotal pusher plate has a trapezoidal or triangular shape and tapers seen in a direction pointing away from the pusher pivoting axis. Preferably a sufficiently long front edge perpendicularly or angularly pointing towards the wrapping material inlet is provided. The web is reliably hit by the longitudinal front edge. This further embodiment with the tapering pusher plate enables implementing the or one pivotal pusher plate with a smaller weight. Therefore the step of pivoting the pusher plate towards the wrapping material inlet requires less kinetic energy. These embodiments can be combined: The wrapping device comprises at least two pivotal pusher plates. One pivotal pusher plate has a rectangular shape and a further pivotal pusher plate a trapezoidal or triangular or tapering shape.

Preferably the or at least one pivotal pusher plate is mounted at the free end of a pivotal lever arm. The pusher plate and the lever arm together form a paddle. The lever arm extends along an axis which is perpendicular or angular to the plate pivoting axis. The lever arm can rotate or otherwise pivot around the pusher pivoting axis. The lever arm can be smaller than the pusher plate, i.e. the dimension of the lever arm seen in a direction parallel to the pusher plate movement is smaller than the dimension of the pusher plate in this direction. This embodiment yields to a reduced weight. Thanks to the reduced weight the pusher plate can be pivoted more quickly without requiring more kinematic energy. Nevertheless the front or outer edge can be made long enough.

Preferably the front edge of the or one pusher plate hits the web in an angular position while the pusher plate is pivoted towards the wrapping material inlet. This means: An angle less than 90° between the front or outer edge of the pusher plate and the web occurs in the moment in which the plate hits the web. When the pusher plate hits the web, an arcuate angle occurs between the inlet longitudinal axis and the longitudinal axis along which the front edge of the pusher plate extends. This embodiment prolongs the time span in which the pivoting pusher plate contacts and shifts the web towards the wrapping material inlet. In addition this embodiment applies a lateral force onto the web which causes a counter-force. This feature further reduces the risk that the pusher plate does not properly inject the web. The reliability of the wrapping procedure is further increased.

The conveying direction in which the web is conveyed towards the wrapping material inlet is preferably perpendicular or angular to the inlet longitudinal axis. The conveying direction can have an offset to the inlet longitudinal axis. The pivotal movement of the pusher plate bridges this offset. In one embodiment the plate pivoting axis for the or one pivotal pusher plate is vertical, i.e. perpendicular to the ground. Preferably the inlet longitudinal axis is horizontal, i.e. parallel to the ground. When the plate pivoting axis is vertical and the pusher plate extends in a plane perpendicular to this axis, the pusher plate trajectory is in a horizontal plane. In the case of a baler which forms a round-cylindrical bale in a drum-shaped bale forming chamber the plate pivoting axis and the inlet longitudinal axis are preferably perpendicular and parallel, resp., to the center axis of the bale while the bale is in the bale forming chamber. For pivoting the pusher plate only frictional force has to be surpassed.

In a further embodiment an arcuate angle occurs between the or at least one plate pivoting axis and an axis perpendicular to the ground. In one implementation the plate pivoting axis is positioned angularly to the vertical orientation such that the force of gravity tends to pivot the pusher plate around this angular axis towards the wrapping material inlet. Thanks to the angular orientation of the pusher plate the pusher plate drive needs to provide less kinetic energy for pivoting the pusher plate towards the wrapping material inlet. The movement in the opposite direction is to be done against the force of gravity but can be performed slowly as a long time span is available, e. g. the entire time span for forming the bale.

In one embodiment the plate pivoting axis of the or at least one web pusher plate is positioned beside the wrapping material inlet when seen in a direction perpendicular to the inlet longitudinal axis and perpendicular to the plate pivoting axis. Preferably this web pusher plate is also substantially beside the wrapping material inlet when the pusher plate is in a parking position. This embodiment further reduces the risk that dirt or debris accumulate on the pusher plate and therefore reduces the risk of a malfunction when injecting the web.

The or at least one pusher plate drive can comprise a double-acting actuator which can pivot the or at least one pusher plate around the perpendicular plate pivoting axis towards the and away from the wrapping material inlet. In a further implementation a biasing element, e.g. at least one spring, tends to pivot the or at least one pusher plate towards the wrapping material inlet. A single-acting actuator can pivot the pusher plate around the perpendicular plate pivoting axis away from the wrapping material inlet against the biasing force provided by the biasing element. Preferably a locking element keeps the pusher plate in a parking position. The locking element prevents an undesired movement of the pusher plate. Releasing the locking element triggers the step that the biasing element pivots the pusher plate towards the wrapping material inlet. The single-acting actuator does not need to provide much kinetic energy as the web pusher plate can slowly be moved into the parking position and as the single-acting actuator is not needed for hitting and pushing the web. The embodiment with the locking element can also be combined with the double-acting actuator.

The actuator can be a hydraulic or electric motor, e.g. The hydraulic or electric source for this actuator can be on board of the bale forming and wrapping apparatus itself or on board of a further vehicle, e.g. a propelled tractor or harvester which pulls the bale forming and wrapping apparatus.

In one embodiment the wrapping apparatus comprises a further web pusher with a further moveable pusher plate and a further pusher plate drive, i.e. at least two web pushers. The further pusher plate drive can move the further pusher plate towards the wrapping material inlet. The moved further pusher plate also hits and pushes the web. More precisely: The further pivoted pusher plate is also pivoted and shifts and thereby pushes the contacted web towards the wrapping material inlet. Preferably the further pusher plate can be moved independently from the pusher plate.

The embodiment with the further pusher plate provides a higher reliability as the web is pushed by two moved pusher plates. The risk is further reduced that the web is not properly injected through the wrapping material inlet into the bale forming chamber, e.g. due to wind or inclination. In addition the web is even pushed if the web is not centered with respect to the wrapping material inlet or if one pusher plate drive malfunctions or one pusher plate is blocked.

In one implementation at least one pusher plate is pivotal around the perpendicular plate pivoting axis and at least one further pusher plate can linearly be moved towards the wrapping material inlet. In a further implementation at least two pusher plates are pivotal, preferably around two plate pivoting axes which are perpendicular to the wrapping material inlet and parallel to each other with a distance between them. Preferably both parallel plate pivoting axes are perpendicular to the inlet longitudinal axis.

Preferably every pusher plate extends in a plane. In the case of two pusher plates both plates may extend in the same plane or may extend in two parallel planes. The plane or planes can be perpendicular to the parallel plate pivoting axes. It is also possible that the two pusher plates operate like two wings of a door. In this pivoting axis of a pusher plate is within the plate plane or parallel to this plate plane.

In one implementation the web is conveyed along a path which guides between the parallel pivoting axes of two pivotal pusher plates. Seen in the conveying direction of the web one pusher plate hits the web from the left-hand side and the other pusher plate from the right-hand side. The pusher plate drive and a further pusher plate drive can pivot both pusher plates. This embodiment further increases the reliability of the wrapping device.

In one implementation the same device serves as the pusher plate drive and as the further pusher plate drive, i.e. can move both pusher plates. In an alternative implementation two different devices with a distance between them serve as the two pusher plate drives. Both implementations can be used for the embodiment with a pivotal further pusher plate as well as for a linearly moveable further pusher plate.

It is possible that both pusher plates pushes the web—either simultaneously or one after the other. If one pusher plate cannot be pivoted or otherwise moved due to a malfunction or misses the web, the other pusher plate still can be moved and pushes the web. Therefore the reliability is increased. Preferably every moveable web pusher plate is pivoted or otherwise moved along a respective path extending in a plate trajectory plane. This plate trajectory plane is parallel to the inlet longitudinal axis. In one implementation the pusher plates are moved in the same trajectory plane. In a further implementation one pusher plate is moved in an upper trajectory plane and the other pusher plate in a lower trajectory plane being parallel to the upper trajectory plane. If the two pusher plates operate like the wings of a door, the wings may be pivoted simultaneously or one after the other.

The wrapping material conveying device conveys the web with a first velocity towards the wrapping material inlet. The web is injected through the wrapping material inlet into the bale forming chamber. The injected web is conveyed with a second velocity. The second velocity can be the same as the first velocity or can be higher. In the case of a higher second velocity the velocity increase can automatically be detected. Not detecting the velocity increase within a given time span is a clue for a malfunction—the web is not injected within this time span.

In general the web is severed or torn after the bale in the bale forming chamber is wrapped. In one embodiment a width reducing device shifts together the web at a shifting position outside of the bale forming chamber. According to one implementation of the width reducing device the web is guided through a changeable gap between two rollers. These rollers are shifted together for reducing the width of the gap. The width reducing device shifts together the web before the web is severed or torn. After shifting together the web it is easier to sever the web. Preferably the width reducing device remains in the width reducing mode until the web for the next bale has been injected into the bale forming chamber. Preferably the or every pivotal pusher plate is positioned between the width reducing device and the wrapping material inlet. Therefore the pivoted pusher plate moves the web towards to wrapping material inlet which has already been shifted together. The risk is further reduced that the web is not properly injected.

The invention can be used for wrapping the bale in the bale forming chamber into a net or into a plastic film or into several strands of twine serving as the wrapping material.

It is possible that the bale forming apparatus comprises two unrolling stations for two reservoirs with two different kinds of wrapping materials, e.g. one reservoir with net and a further reservoir with plastic film. It is possible that the bale forming apparatus uses the same wrapping material inlet for selectively injecting the first or the second kind of wrapping material. It is further possible that the bale forming apparatus comprises two different wrapping material inlets assigned to the two unrolling stations. It is possible that the bale forming apparatus comprises only one pivotal web pusher for one wrapping material inlet. It is also possible that at least one respective web pusher is assigned to every wrapping material inlet.

In one implementation the web pusher for pushing plastic film is pivotal around an axis which is perpendicular to the inlet longitudinal axis of the only inlet or of the inlet for plastic film. A further web pusher can push a net or twine strands and is also pivotal around a perpendicular axis or is movable in a further way, e.g. can linearly be shifted.

The bale forming and wrapping apparatus can be a part of a vehicle which drives or which is pulled over ground, in particular a part of an agricultural harvester which picks up or otherwise receives crop material from the ground and processes the received crop material. The inlet longitudinal axis is preferably perpendicular to the vehicle's travelling direction.

The bale forming apparatus can also be a part of a stationary plant which presses garbage or recycling or other loose parts to bales.

These and other aspects of the invention and of the preferred embodiment will be even more apparent from the detailed embodiment as described below and will be elucidated in detail there.

DETAILED DESCRIPTION OF EMBODIMENT

In the embodiments described below the invention is used on board of a bale forming apparatus (round baler) which subsequently forms several round-cylindrical bales in a drum-shaped bale forming chamber surrounded by a casing. The round baler is pulled over ground in a travelling direction TD, e.g. by a tractor or propelled harvester. In the following the terms "left" and "right" refer to the baler's travelling direction TD. The terms "horizontal" and "vertical" denote a position relative to the earth surface over which the baler is moved. The terms "below" and "above" refer to the usual vertical orientation with respect to a horizontal viewing direction.

The baler of the embodiments operates as follows:

A pick-up unit picks up loose crop material (hey, straw, silage e.g.) from the ground.

A conveying rotor conveys the picked-up crop material in a direction opposite to the travelling direction TD through a feeding channel towards the bale forming chamber.

Optionally the conveyed crop material is cut by several knives which engage from below or above into the feeding channel and cooperate with the conveying rotor.

A bale forming means provides the circumferential surface of a drum-shaped bale forming chamber. The diameter of the bale forming chamber can be fixed or variable. The conveyed crop material is injected into the bale forming chamber.

The bale forming means applies pressure onto the injected crop material and subsequently forms several round-cylindrical bales from the injected crop material. The bale forming means comprises several driven pressing rollers and can comprise at least one pressing belt.

As crop material is injected into the bale forming chamber, a round-cylindrical bale increases in the bale forming chamber. After an increasing bale in the bale forming chamber has reached the required diameter, the circumferential surface of the bale is wrapped into several layers of a web of wrapping material. In the embodiments the web is a plastic film which is impermeable. It is also possible to use a net or several strands of twine as the web of wrapping material.

After the required number of wrapping material layers is placed around the bale's circumferential surface, the web is severed at a severing location outside of the bale forming chamber. A slack leading segment (front segment) of the web is formed.

A discharge gate of the casing is opened. The wrapped bale is ejected out of the bale forming chamber.

Optionally a wrapper behind the baler wraps the entire surface of the ejected bale into an impermeable sheet. The wrapped bale is deposited on the ground.

The discharge gate is closed again. The round baler starts to form in the same way a further bale from picked-up crop or otherwise received material.

Figure 1:
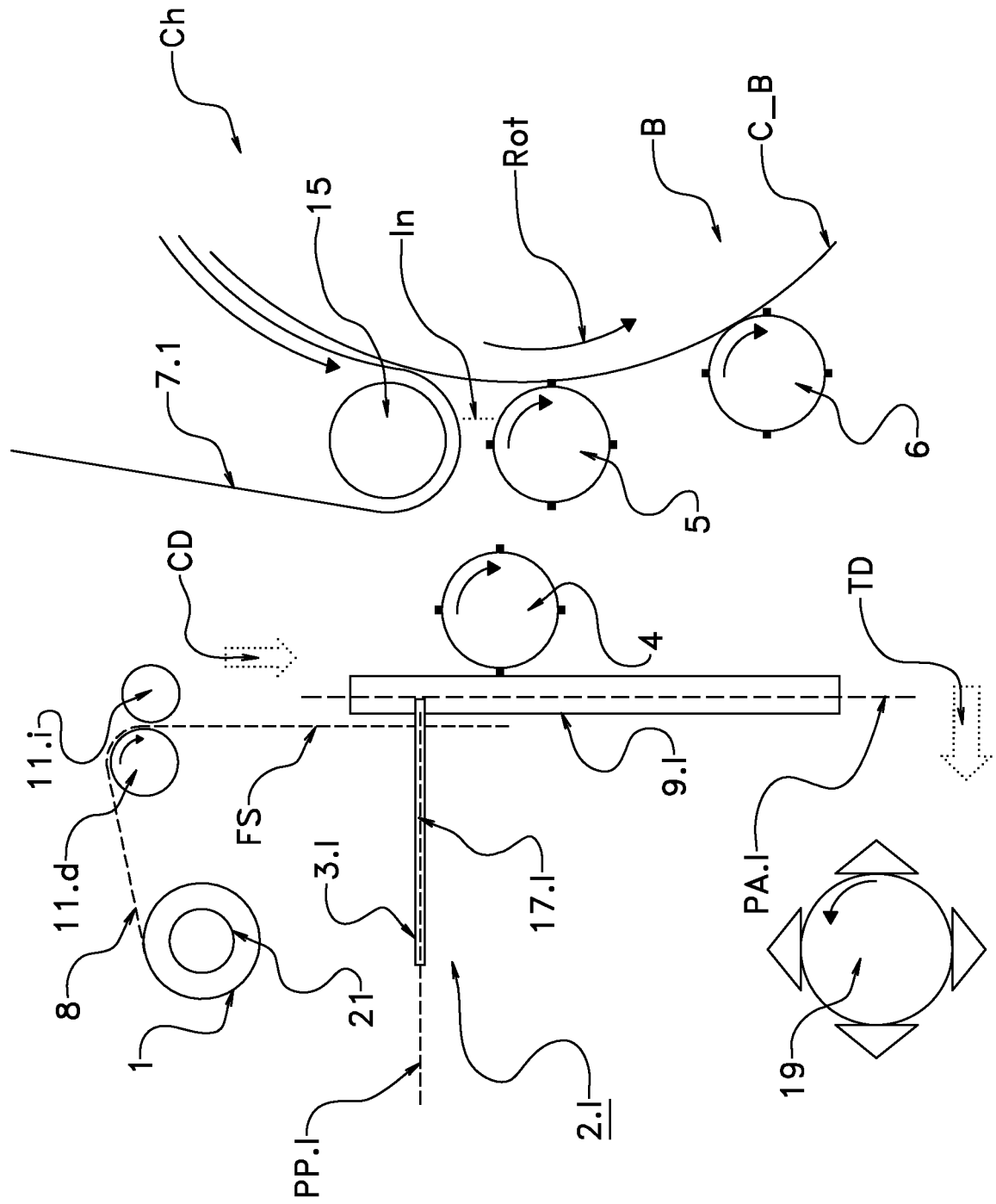
FIG. 1 shows the wrapping device according to a first application (two pulling rollers and a web feeding roller) of the invention in a side view from the left.
Figure 2:
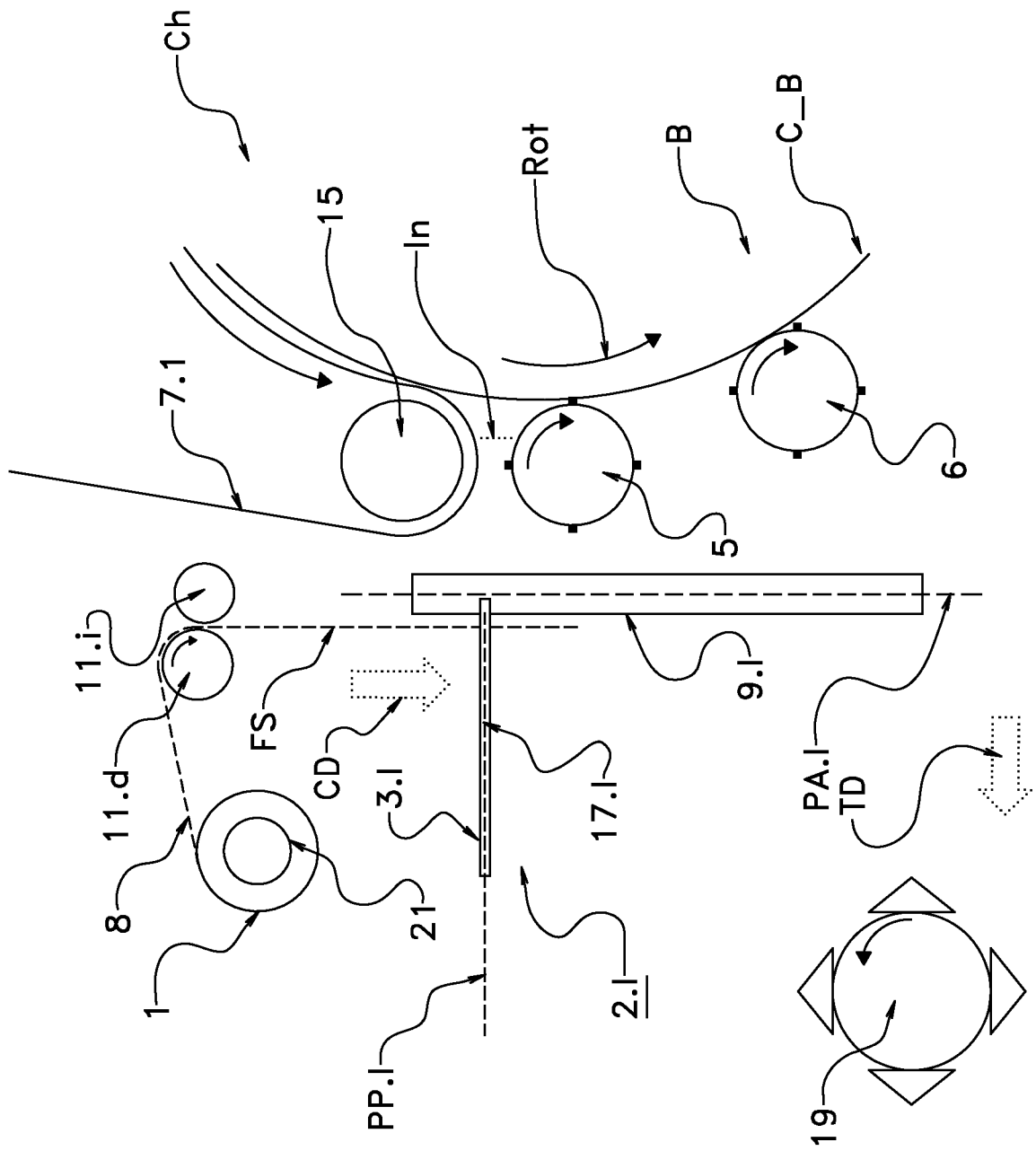
FIG. 2 shows the wrapping device according to a second application (two pulling rollers, no web feeding roller) of the invention in the viewing direction of FIG. 1.
Figure 3:
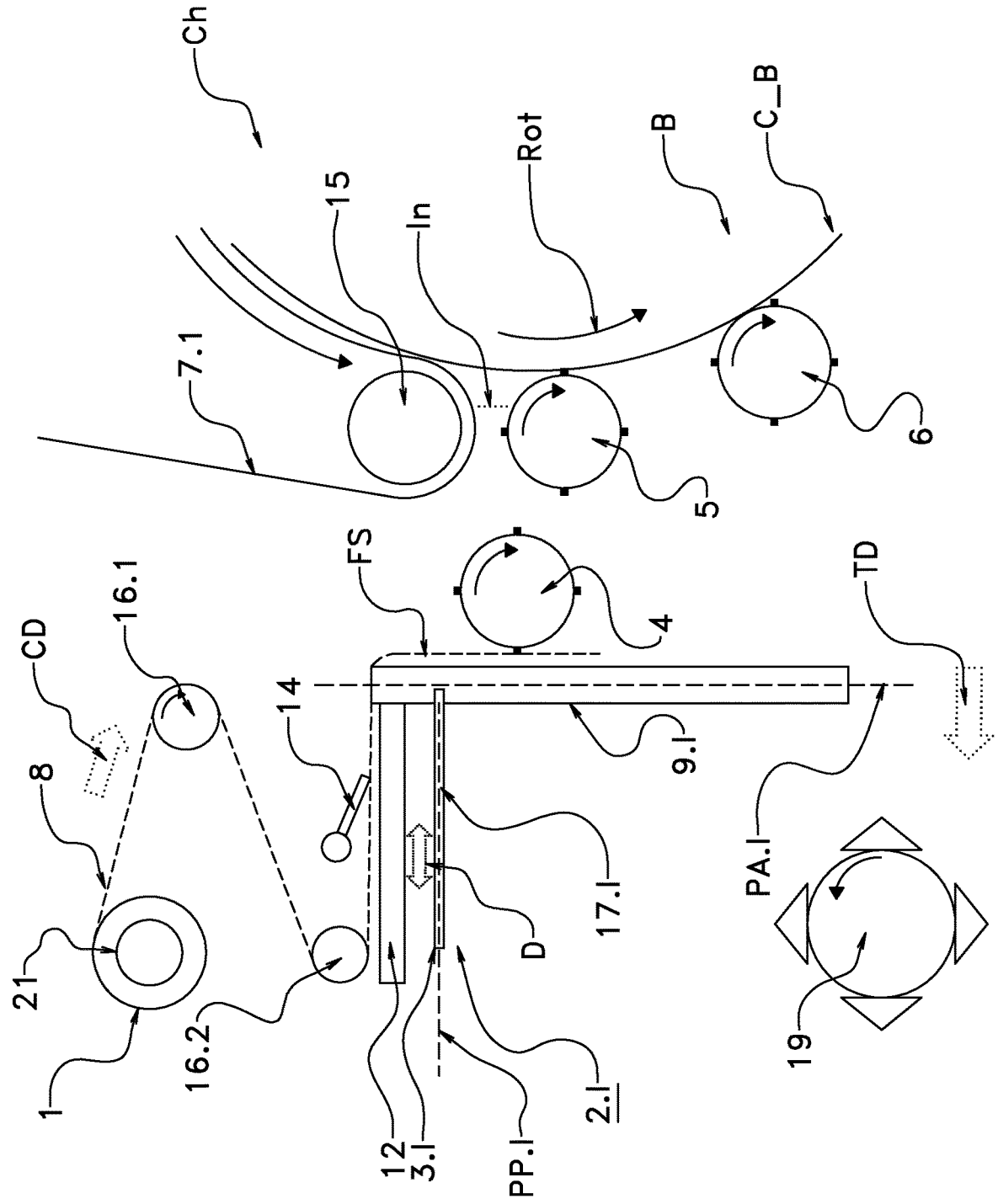
FIG. 3 shows the wrapping device according to a third application (no pulling rollers but a web conveying table and a web feeding roller) of the invention in the viewing direction of FIG. 1.

FIG. 1 to FIG. 3 show three different applications of the invention in a side view from the left, i.e. the travelling direction TD of the baler is from right to left and the left-hand side of the round baler points to the observer.

FIG. 1 to FIG. 3 show the following parts of the round baler:

the conveying rotor 19 above the feeding channel and the rotor rotation direction (anti-clockwise), the outer endless left pressing belt 7.1 surrounding the bale forming chamber Ch together with three further endless pressing belts 7.2 to 7.4 (cf. FIG. 4 to FIG. 8), a belt deflecting roller 15 around which the pressing belt 7.1 and the three further pressing belts 7.2, 7.3, 7.4 are guided, and two driven pressing rollers 5, 6 which delimit a crop material inlet and which comprises several longitudinal ribs on their circumferential surfaces.

A round-cylindrical bale B in the pressing chamber Ch is rotated by the belts 7.1, . . . , 7.4 and the rollers 5, 6 while increasing as well as while being wrapped. The bale B is therefore rotated clockwise in the direction Rot around the bale center axis which is perpendicular to the drawing planes of FIG. 1 to FIG. 3 and in the drawing planes of FIG. 4 to FIG. 8. Preferably the bale B is rotated with a constant rotational frequency. The circumferential surface C_B of the bale B extends parallel to the bale center axis from one front face to the other front face of the bale.

A wrapping material inlet In is delimited from below by the upper pressing roller 5 and from above by those segments of the four parallel pressing belts 7.1, . . . , 7.4 which are guided around the roller 15. This wrapping material inlet In extends along a horizontal inlet longitudinal axis IA which is perpendicular to the baler's travelling direction TD and perpendicular to the drawing planes of FIG. 1 to FIG. 3 and in the drawing planes of FIG. 4 to FIG. 8. The wrapping material inlet In can alternatively be limited from above by a further pressing roller (not shown).

FIG. 1 to FIG. 3 show the following further parts:
a left web pusher 2.*l* with a left pusher plate 3.*l* and a left vertical supporting axle 9.*l* (to be explained below),
a supply reel 1 for wrapping material,
an axle or shaft stub 21 which belongs to an unrolling station 4 carrying the supply reel 1 and which engages into the hollow kernel of the supply reel 1,
the web 8 of wrapping material taken from the supply reel 1, and
a sagging front segment FS of the web 8.

The left pusher plate 3.*l* has a front edge 10.*l* and extends in a plane PP.l. The wrapping device can comprise a right web pusher 2.*r* with a right pusher plate 3.*r*, cf. FIG. 6 and FIG. 8. The right pusher plate 3.*r* has a front edge 10.*r* and extends in a plane PP.r.

Wrapping in the bale forming chamber Ch the circumferential surface C_B of the bale B is performed as follows:
The unrolling station with the axle 21 rotatably holds the supply reel 1 with wrapping material.
A slack leading segment FS of the conveyed web 8 protrudes from a touching part of the wrapping material conveying device in a direction towards the wrapping material inlet In. At least a part of the slack leading segment FS sags freely downward.
Optionally the web 8 is guided through the gap between two lateral rollers 18.*l*, 18.*r* belonging to a web width reducing device (cf. FIG. 4.). A width reducing drive can reduce and increase the distance between these rollers 18.*l*, 18.*r*. When having the reduced distance, the rollers 18.*l* and 18.*r* shift together the web 8.
A wrapping material conveying device touches the web 8 of wrapping material and conveys the touched web 8 towards the wrapping material inlet In. The three applications shown in FIG. 1 to FIG. 3 refer to different implementations and configurations of the wrapping material conveying device which are explained below. The web 8 is conveyed with a first velocity towards the wrapping material inlet In.
At least one pivotal web pusher plate 3.*l*, 3.*r* of a web pusher 2.*l*, 2.*r* is pivoted from a parking position around the vertical pivoting axis PA.l, PA.r towards the wrapping material inlet In and pushes the front segment FS of the conveyed web 8 further towards the wrapping material inlet In. The or every web pusher plate 3.*l*, 3.*r* is positioned between the wrapping material conveying device and the wrapping material inlet In. The or every pusher plate 3.*l*, 3.*r* can be pivoted between a parking position and a final engaging position which is closest to the bale forming chamber Ch. In one embodiment the wrapping device comprises exactly one pivotal pusher plate 3.*l*. The figures show the plate pivoting axis PA.l and the plate plane PP.l of the left pusher plate 3.*l*. It is also possible that two pusher plates 3.*l*, 3.*r* are moved simultaneously or one behind the other towards the wrapping material inlet In wherein at least one pusher plate is pivoted.
Optionally a web feeding roller 4 with ribs (FIG. 1, FIG. 3) is positioned adjacent to the pressing roller 5 forming the lower border of the wrapping material inlet In and angularly or vertically below the pusher plate 3.*l*, 3.*r*. This web feeding roller 4 further conveys the web 8 towards the wrapping material inlet In.
The conveyed and pushed web 8 is injected through the wrapping material inlet In into the bale forming chamber Ch. The web 8 is clamped between the circumferential surface C_B of the bale B being rotated in the direction Rot and the bale forming means 5, 6, 7.1, . . . , 7.4. The clamped web 8 is pulled from the supply reel 1. Thereby the supply reel 1 is rotated around its center axis. The injected web 8 is conveyed with a second velocity. As only low slippage between the injected web 8 and the bale B occurs, the second velocity is approximately equal to the circumferential velocity of the rotated bale B.
In one embodiment the second velocity (achieved after injecting the web 8) is greater than the first velocity. It is possible that a web movement sensor measures the conveying velocity of the web 8. If no velocity increase is detected after a given time span, the web 8 is not injected properly. This time span commences with the start of moving the web 8 and depends on the length of the path from the touching point to the inlet In and the first velocity.
After the web 8 has been injected into the bale forming chamber Ch, the or every pusher plate 3.*l*, 3.*r* is moved in the opposite direction away from the wrapping material inlet In back into the parking position.
After the injected web 8 is clamped, a brake decelerates and brakes the rotating supply reel 1. In one implementation a brake shoe engages a brake disc which is mounted on the axle 21 of the unrolling station. This axle 21, e.g. implemented as a shaft stub, engages into and contacts the hollow kernel of the supply reel 1 and thereby decelerates the supply reel 1 when the brake disc contacts the axle 21. It is also possible that a braking body contacts the circumferential surface of the supply reel 1.
The injected and clamped web 8 is tensioned by the decelerated supply reel 1 from the one side and by the rotated bale B together with the bale forming means 5, 6, 7.1, . . . from the other side.
After the required number of wrapping material layers are placed around the bale's circumferential surface C_B, the lateral rollers 18.*l*, 18.*r* shift together the web 8. The web 8 is severed after the rollers 18.*l*, 18.*r* have shifted together the web 8.

Figure 4:
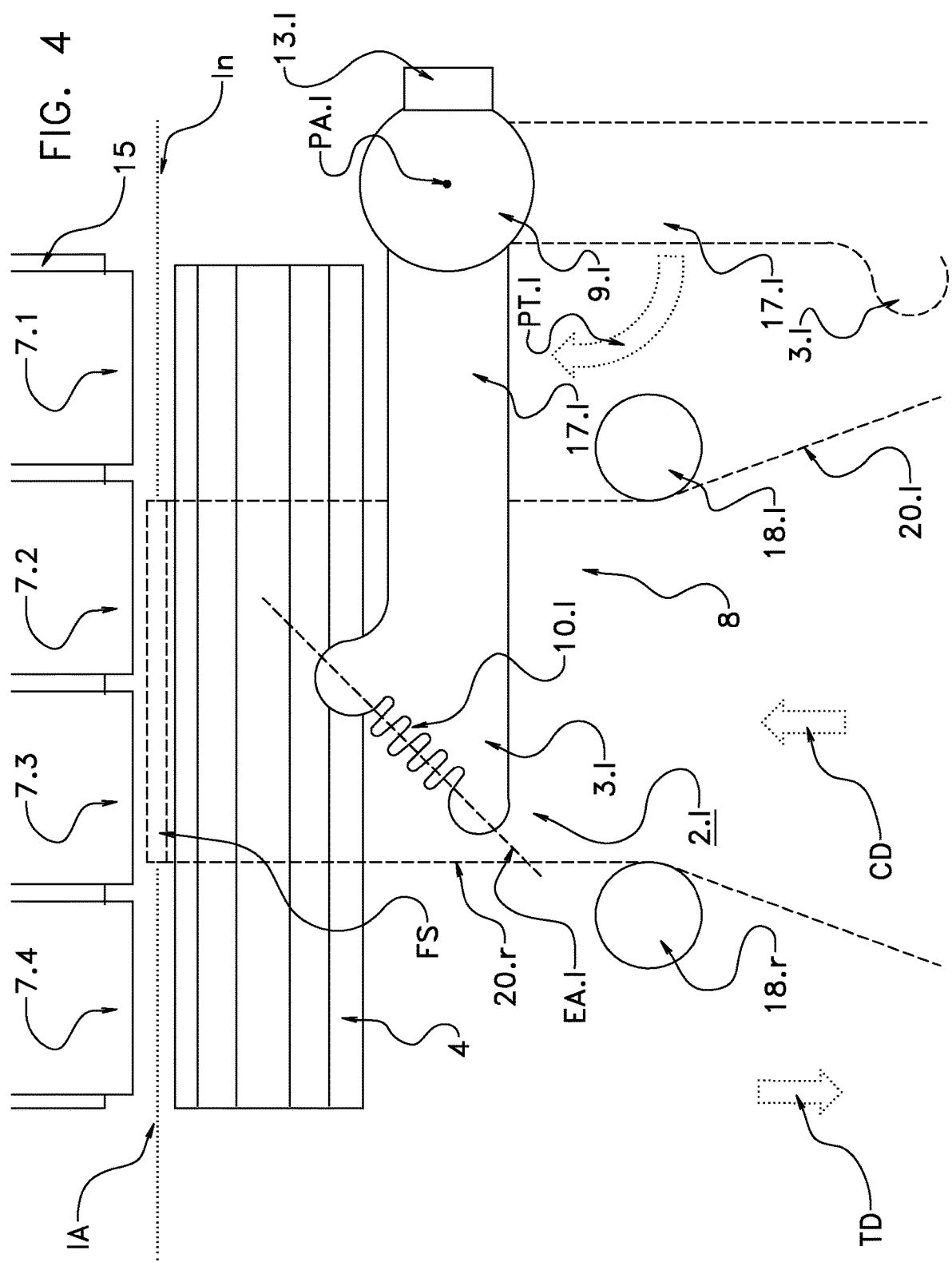
FIG. 4 shows in a top view a first embodiment of the invention (one pusher plate) for the first application (two pulling rollers and a web feeding roller)
Figure 5:
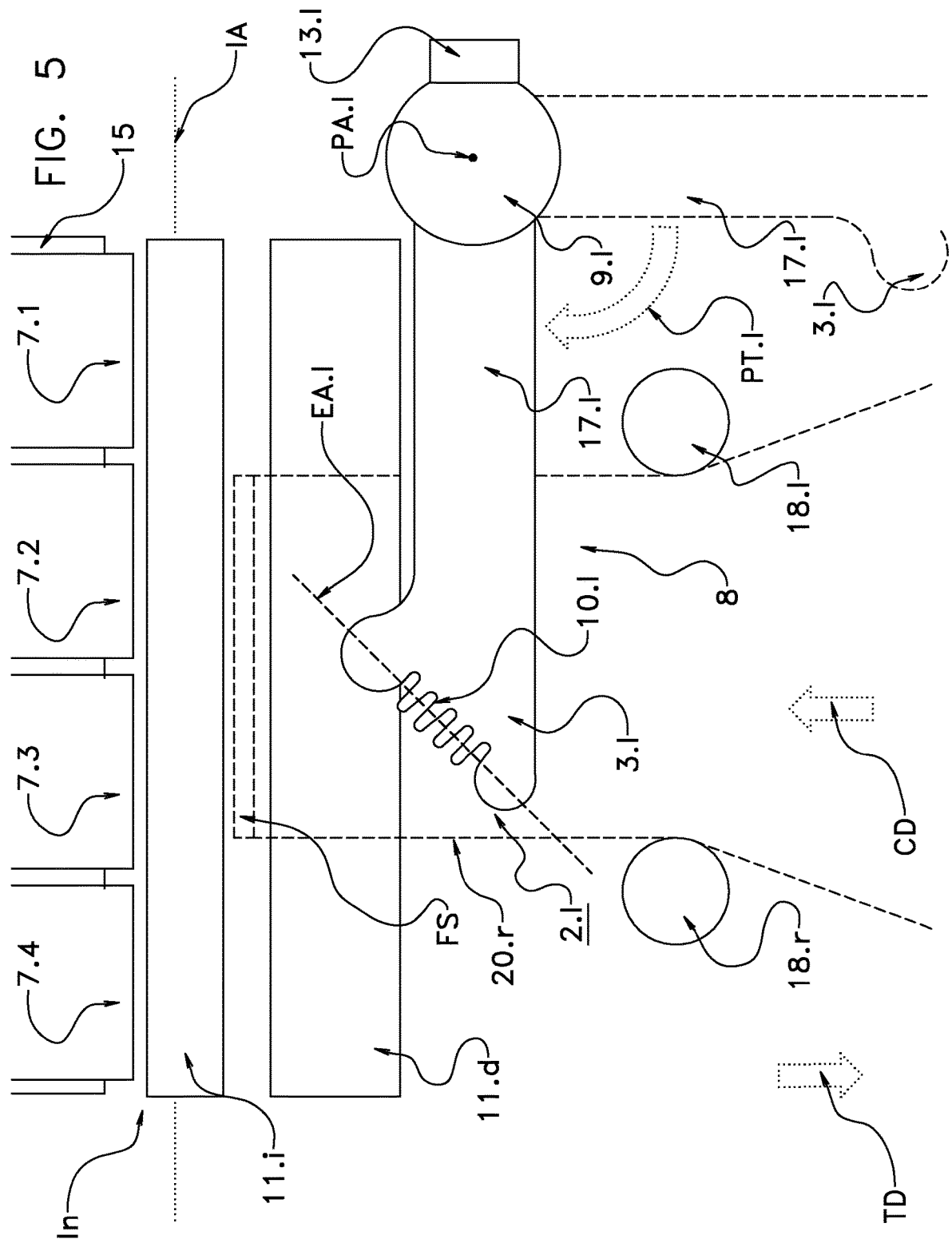
FIG. 5 shows in the viewing direction of FIG. 4 the first embodiment of the invention (one pusher plate) for the second application (two pulling rollers and no web feeding roller)
Figure 6:
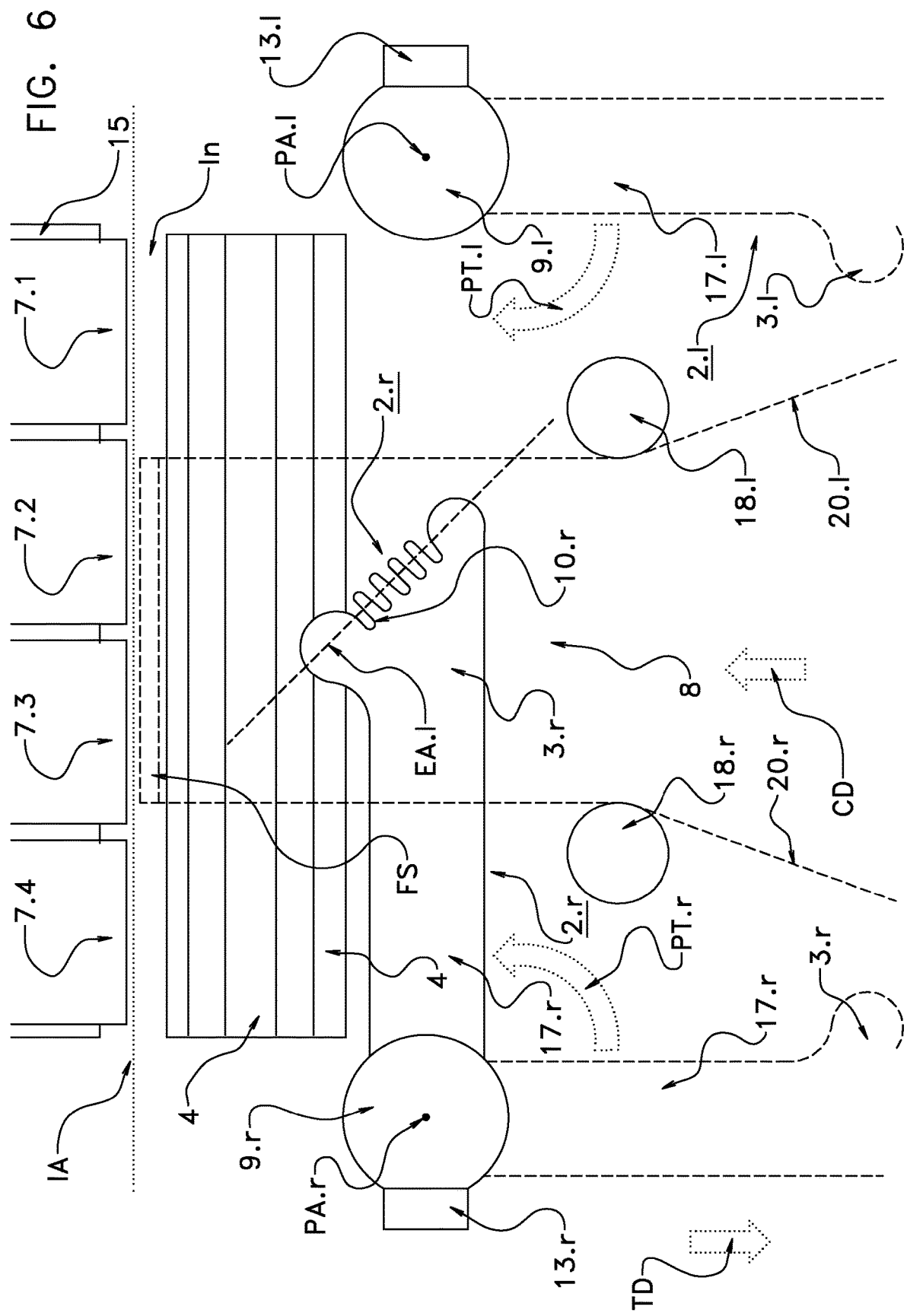
FIG. 6 shows in the viewing direction of FIG. 4 a second embodiment of the invention (two pusher plates) for the first application (two pulling rollers and a web feeding roller)

The web 8 and the left and right lateral edges 20.*l*, 20.*r* of the web 8 are shown in the top view of FIG. 4 to FIG. 6. The web 8 is conveyed in a conveying direction CD towards the wrapping material inlet In.

Preferably the protruding leading segment FS of the web 8 is slack and so long that the following effect is achieved: The or every pivoted pusher plate 3.*l*, 3.*r* hits and shifts the leading segment FS but does not apply a tension or pulling force onto the web 8. The leading segment FS remains slack until being injected into the bale forming chamber Ch. This embodiment reduces the risk that the web 8 is damaged by the or one pivotal pusher plate 3.*l*, 3.*r*. This risk occurs in particular if the web 8 is a plastic film. Preferably the event that the pivotal pusher plate 3.*l*, 3.*r* hits the web 8 has the effect that a bulge is formed in the slack leading segment FS and is injected through the wrapping material inlet In into the bale forming chamber Ch.

In the first and second applications the wrapping material conveying device comprises two pulling rollers 11.*d*, 11.*i*. One pulling roller 11.*d* is driven and has a rubber surface. The other pulling roller 11.*i* is an idler roller with a smooth surface and is biased against the driven pulling roller 11.*d*. The pulling rollers 11.*d*, 11.*i* always clamp the web 8 between them. In the beginning of a wrapping process they pull the clamped web 8. An increasing leading segment FS protrudes from the pulling rollers 11.*d*, 11.*i* and remains slack until the leading segment FS is injected into the bale forming chamber Ch and is clamped between the bale forming means 5, 6, 7.1, . . . and the rotated bale B. After the web 8 is inserted, the pulling roller 11.*d* is no longer driven but operates as an idler roller.

FIG. 1 shows the first application of the wrapping material conveying device and FIG. 2 shows the second application. In both applications the web 8 is clamped between the driven pulling roller 11.*d* and the idler roller 11.*i*. An increasing leading segment FS sags down from the pulling rollers 11.*d*, 11.*i*. In FIG. 1 the web 8 is further conveyed by the web feeding roller 4. It is possible that the sagging leading segment FS drops onto the web feeding roller 4. In place of a web feeding roller 4 a guiding sheet can be mounted below the pulling rollers 11.*d*, 11.*i*. This guiding sheet shifts the web 8 towards the wrapping material inlet In.

In a third application (FIG. 3) the web 8 is guided around two rollers 16.1 and 16.2. The leading segment FS of the web 8 rests on a web conveying table 12 which is moved towards the wrapping material inlet In. The roller 16.2 is connected with the conveying table 12 and is moved together with the conveying table 12. The leading segment FS reaches from the roller 16.2 to the leading edge of the web 8. A retaining device 14 above the web conveying table 12 is also moved together with the conveying table 12, keeps the web 8 on the web conveying table 12, and prevents the web 8 from slipping from the web conveying table 12. Preferably the leading segment FS on the web conveying table 12 remains slack until the leading segment FS is injected into the bale forming chamber Ch.

FIG. 3 shows the third application with the web conveying table 12 and the web retaining device 14. The web 8 is further guided around the two web deflecting rollers 16.1, 16.2 positioned upstream of the web conveying table 12. The leading segment FS extends between the web front edge and the lower web deflecting roller 16.2. The web conveying table 12 together with the roller 16.2 can be shifted towards the and away from the wrapping material inlet In. The possible linear movements of the web conveying table 12 are sketched by the double arrow D.

It is also possible that the web 8 is clamped between two plates or yaws which operate like a duckbill and convey the clamped web 8 towards the wrapping material inlet In.

FIG. 4 to FIG. 6 show two embodiments of the wrapping device according to the invention in a top view. In FIG. 4 and FIG. 5 the wrapping device comprises one left web pusher 2.*l* (first embodiment) which is shown in the final engaging position (continuous lines) and in the parking position (dotted lines). FIG. 6 shows an embodiment with a left web pusher 2.*l* and a right pivotal web pusher 2.*r* (second embodiment).

In the embodiments the pusher plates 3.*l* and 3.*r* are always positioned outside of the wrapping material inlet In, i.e. also when being in the engaging position. It is also possible that a pusher plate 3.*l*, 3.*r* being in the final engaging position engages into the wrapping material inlet In. Moving the pusher plate 3.*l*, 3.*r* into this engaging position cleans the wrapping material inlet In from dirt and debris.

In the embodiment every pusher plate 3.*l*, 3.*r* can be pivoted around the respective pivoting axis PA.l, PA.r about approx. 90 degrees. It is also possible that at least one pusher plate can be moved about an angle being larger than 90 degrees. The or every plate pivoting axis PA.l, PA.r is positioned beside the wrapping material inlet In.

FIG. 4 and FIG. 6 refer to the first application (two pulling rollers 11.*d*, 11.*i* and a web feeding roller 4). FIG. 5 refers to the second application (two pulling rollers 11.*d*, 11.*i* and no web feeding roller). In FIG. 6 the right web pusher 2.*r* is shown in the engaging position (continuous lines) and in the parking position (dotted lines). The left web pusher 2.*l* is only shown in the parking position. The respective plate drive 13.*l*, 13.*r* is shown schematically.

Figure 7:
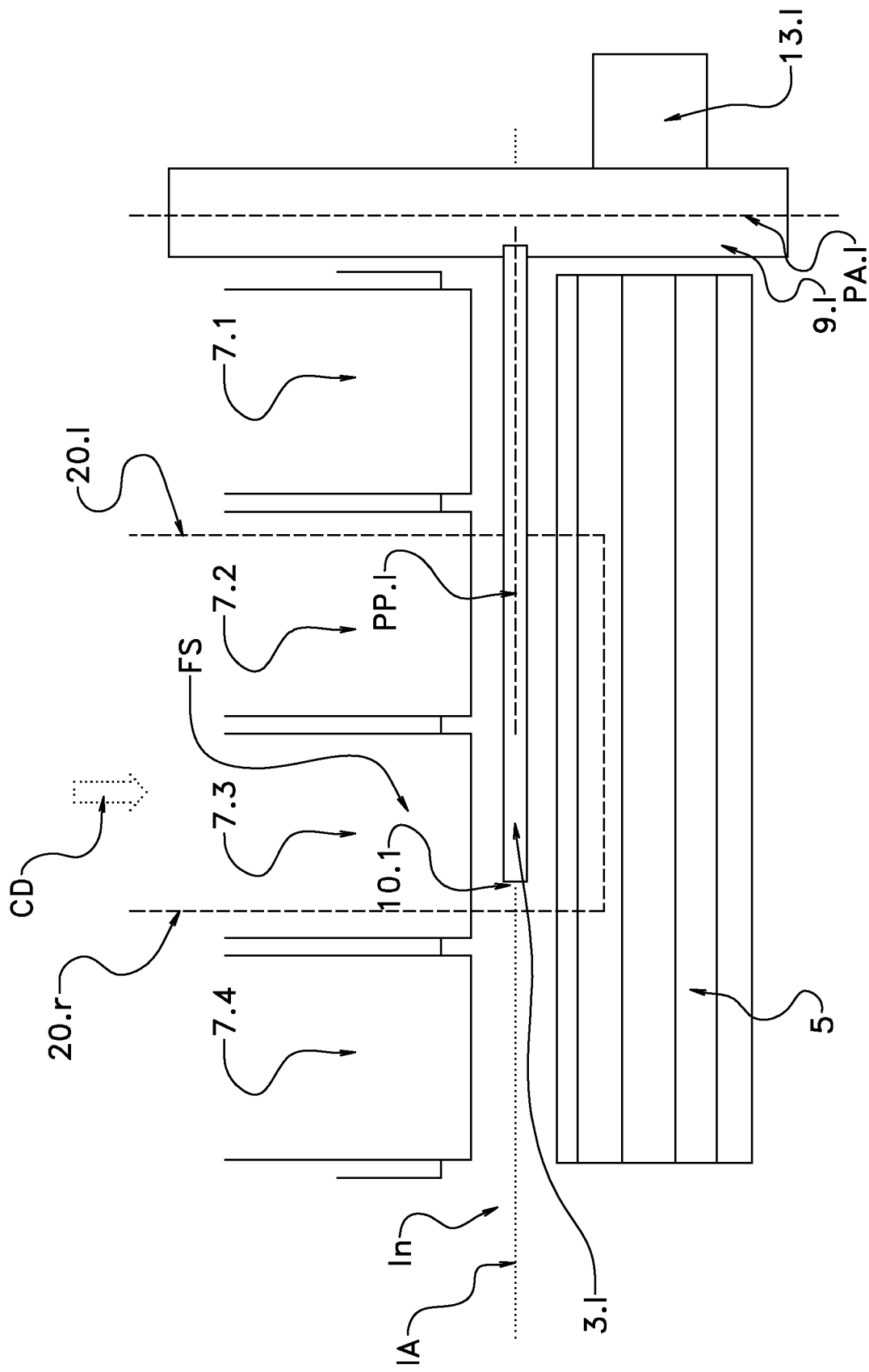
FIG. 7 shows in a front view the first embodiment (one pusher plate) of FIG. 5.
Figure 8:
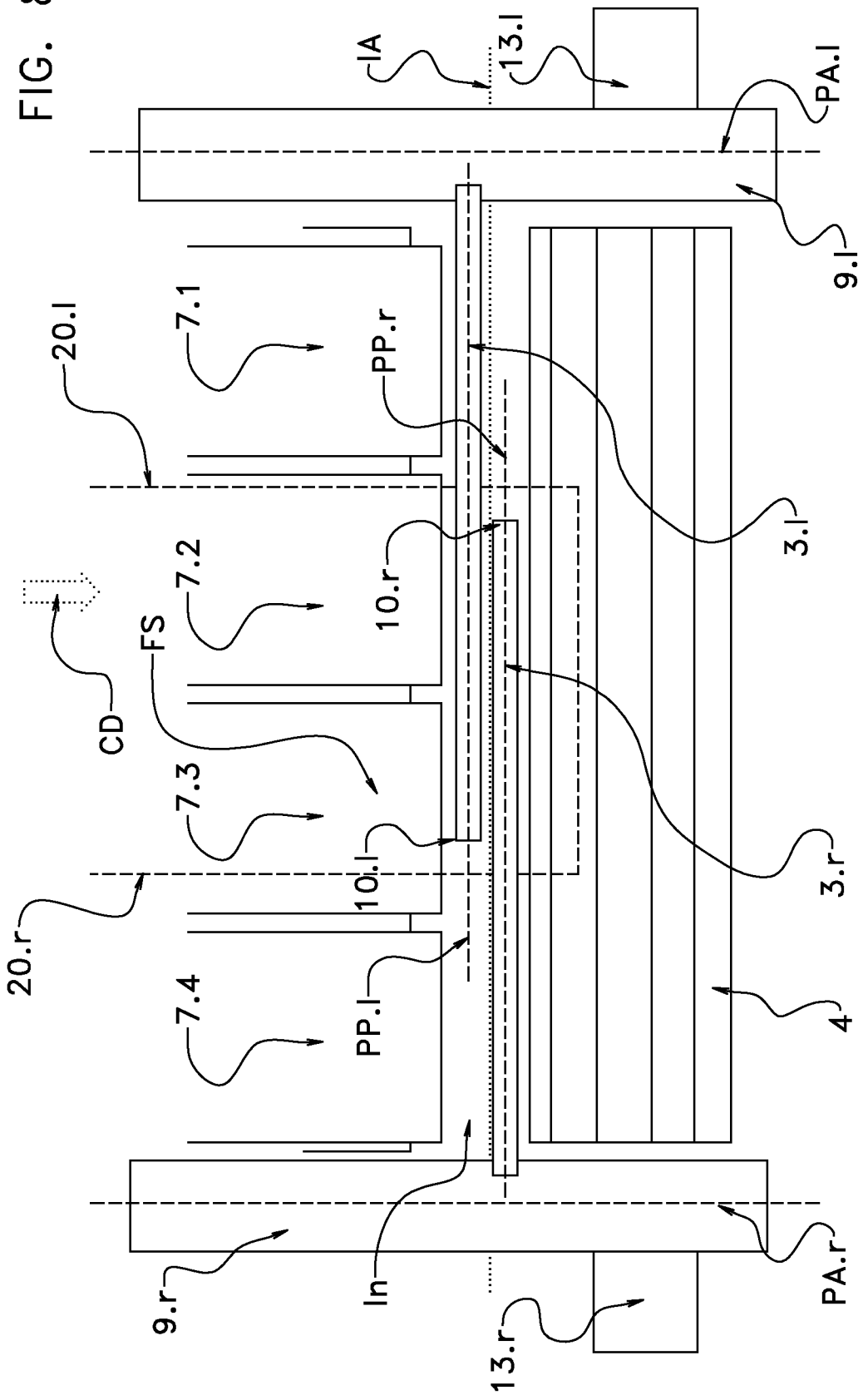
FIG. 8 shows in the viewing direction of FIG. 7 the second embodiment of FIG. 6 (two pusher plates).

FIG. 7 shows the second application (two pulling rollers, no web feeding roller) and the first embodiment (one left web pusher 2.*l*) according to FIG. 5 in a front view in a viewing direction opposite to the travelling direction TD. FIG. 8 shows the second embodiment of FIG. 6 (two web pushers 2.*l*, 2.*r*) in this front view. The two pusher plates 3.*l*, 3.*r* according to the second embodiment can be positioned in the same horizontal plane or in two parallel horizontal planes. In the implementation of the second embodiment according to FIG. 6 and FIG. 8 the two pusher plates 3.*l*, 3.*r* partially overlap when viewed in a vertical viewing direction (parallel to the plate pivoting axes PA.l, PA.r and perpendicular to the drawing plane of FIG. 6 and in the drawing plane of FIG. 8).

The or every web pusher 2.*l*, 2.*r* comprises a pusher plate 3.*l*, 3.*r* which can be pivoted around a respective plate pivoting axis PA.l, PA.r. This pivoting axis PA.l, PA.r is perpendicular to the inlet longitudinal axis IA. In the embodiment the or every pivoting axis PA.l, PA.r is vertical and therefore in the drawing plane of FIG. 1 to FIG. 3, FIG. 7, and FIG. 8 and perpendicular to the drawing planes of FIG. 4 to FIG. 6. It is also possible that the or every pivoting axis PA.l, PA.r is sloping with respect to the vertical orientation, preferably such that the force of gravity tends to pivot the pusher plate 3.*l*, 3.*r* towards the wrapping material inlet In.

In the embodiment the or every pusher plate 3.*l*, 3.*r* has a trapezoidal or triangular shape with a serrated edge 10.*l*, 10.*r*. The serrated edge 10.*l*, 10.*r* points towards the web 8 at least when reaching the engaging position. The leading segment FS of the web 8 is positioned between the serrated edge 10.*l*, 10.*r* and the wrapping material inlet In when the pusher plate 3.*l*, 3.*r* is pivoted. In the embodiment the pusher plate 3.*l*, 3.*r* tapers seen in a direction perpendicular to the pivoting axis PA.l, PA.r and towards the center axis of the web 8.

In one embodiment the serrated edge 10.*l*, 10.*r* is parallel to the inlet longitudinal axis IA and therefore parallel to the width of the web 8 when the pusher plate 3.*l*, 3.*r* is in the engaging position. In a preferred embodiment, however, the serrated edge 10.*l*, 10.*r* is angular with respect to the inlet longitudinal axis IA when hitting the web 8 and when reaching the engaging position. FIG. 4 to FIG. 6 show this angular orientation. This angular orientation prolongs the time span in which the pusher plate 3.*l*, 3.*r* hits the web 8. The reliability of the wrapping process is further increased.

The or every pivotal pusher plate 3.*l*, 3.*r* is mounted on the free end of a lever arm 17.*l*, 17.*r*—similar to a paddle or spoon. The lever arm 17.*l*, 17.*r* extends along a lever longitudinal axis from the plate pivoting axis PA.l, PA.r to the pusher plate 3.l, 3.r and is perpendicular to the plate pivoting axis PA.l, PA.r. The width of the lever arm 17.l, 17.r perpendicular to the lever longitudinal axis is smaller than the largest width of the pusher plate 3.l, 3.r. Thanks to the lever arm 17.l, 17.r a distance between the pusher plate 3.l, 3.r and the plate pivoting axis PA.l, PA.r occurs. The serrated edge 10.l, 10.r extends along an edge axis EA.l, EA.r which is angular to the length axis of the lever arm 17.l, 17.r. It is also possible that the plate pivoting axis PA.l, PA.r runs through the pusher plate 3.l, 3.r and that no lever arm 17.l, 17.r is provided.

In the embodiment the or every lever arm 17.l, 17.r is mechanically connected with a supporting axle 9.l, 9.r. FIG. 1 to FIG. 3, FIG. 7, and FIG. 8 show the left supporting axle 9.l in a side view. FIG. 4 and FIG. 5 show the left supporting axle 9.l from above. FIG. 6 shows the left and right supporting axles 9.l, 9.r from above. The or every supporting axle 9.l, 9.r extends along an axis longitudinal axis which forms the respective pivoting axis PA.l, PA.r of a web pusher 2.l, 2.r and which is perpendicular to the inlet longitudinal axis IA. Preferably the supporting axles 9.l, 9.r and the pivoting axis PA.l, PA.r are positioned vertical to the ground.

The pusher plate 3.l, 3.r can be pivoted around the respective pivoting axis PA.l, PA.r from the parking position towards the wrapping material inlet In into the engaging position and back from the engaging position into the parking position. The top views of FIG. 4 to FIG. 6 sketch the left pusher plate trajectory PT.l along which the left pusher plate 3.l is pivoted into the engaging position. This circular pusher plate trajectory PT.l is shown in the drawing planes of FIG. 4 to FIG. 6 and coincides with the pusher plate plane PP.l. The inlet longitudinal axis IA is parallel to these drawing planes. FIG. 6 additionally shows the right pusher plate trajectory PT.r of the right pusher plate 3.r.

While a pusher plate 3.l, 3.r is pivoted from the parking position into the engaging position, the serrated edge 10.l, 10.r of this pusher plate 3.l, 3.r hits the sagging and slack leading segment FS of the web 8 protruding from the wrapping material conveying device. The serrated edge 10.l, 10.r has an angular orientation with respect to the web 8. This trajectory PT.r is in the plane PP.r in which the right pusher plate 3.r extends.

In one implementation (not shown) the pivoted pusher plate 3.l, 3.r being in the engaging position engages into the wrapping material inlet In. Thereby dirt and debris are shifted together with the web 8 through the wrapping material inlet In into the bale forming chamber Ch and the wrapping material inlet In is cleaned.

In the second embodiment with two web pushers 2.l, 2.r (cf. FIG. 6 and FIG. 8) the sagging leading segment FS of the web 8 is hit from two sides and is shifted towards the wrapping material inlet In. The web 8 is conveyed between the two supporting axles 9.l and 9.r of the two pusher plates 3.l and 3.r towards the wrapping material inlet In. In the first embodiment with one web pusher 2.l the serrated edge 10.l hits the web 8 substantially in a central region of the web 8. The web 8 is conveyed along the supporting axle 9.l.

A respective pusher plate drive 13.l, 13.r can rotate the or one lever arm 17.l, 17.r around the respective pivoting axis PA.l, PA.r and can thereby pivot the or one pusher plate 3.l, 3.r from the parking position into the engaging position and back into the parking position. In FIG. 4, FIG. 5, and FIG. 7 one single drive 13.l for the left pusher plate 3.l is shown. FIG. 6 and FIG. 8 shows two distinct single drives 13.l, 13.r for the two pusher plates 3.l, 3.r. The second embodiment according to FIG. 6 and FIG. 8 comprises two web pushers 2.l, 2.r comprising the two pusher plates 3.l, 3.r and two single pusher plate drives 13.l, 13.r.

In one implementation the pusher plate drive 13.l, 13.r rotates the or one lever arm 17.l, 17.r. The lever arm 17.l, 17.r is rigidly connected with a sleeve or bushing surrounding the stationary supporting axle 9.l, 9.r. In a further implementation the lever arm 17.l, 17.r is rigidly connected with the rotatable supporting axle 9.l, 9.r. The pusher plate drive 13.l, 13.r rotates the or every supporting axle 9.l, 9.r, e.g. via a lever or a sprocket wheel. In both implementations it is not necessary to directly connect the pusher plate drive 13.l, 13.r with the pusher plate 3.l, 3.r. It is also possible that the lever arm 17.l, 17.r is rotatably mounted on a pin, e.g. by means of a connecting end piece which extends along the plate pivoting axis PA.l, PA.r. The lever arm 17.l, 17.r can be lifted and thereby removed from the pin.

Different implementations of the pusher plate drive 13.l, 13.r are possible. In one implementation at least one spring or further biasing element (not shown) tends to pivot the pusher plate 3.l, 3.r towards the wrapping material inlet In. In the second embodiment two springs for the two pusher plates 3.l, 3.r may be provided. A single-acting actuator, e.g. a hydraulic piston-cylinder device, can pivot the pusher plate 3.l, 3.r against the force of the spring into the parking position. In the second embodiment two single-acting actuators may be provided. Preferably a respective locking element (not shown) keeps the pusher plate 3.l, 3.r in the parking position (dotted lines in FIG. 4 to FIG. 6) and prevents an undesired pivotal movement. After the pusher plate 3.l, 3.r has reached the parking position, the locking element locks the pusher plate 3.l, 3.r in the parking position and the single-acting actuator is switched off. For pivoting the or one pusher plate 3.l, 3.r from the parking position into the engaging position, the pusher plate 3.l, 3.r is released by de-activating the locking element. The spring pivots the released pusher plate 3.l, 3.r quickly towards the wrapping material inlet In. Therefore the pusher plate 3.l, 3.r is rapidly moved into the engaging position (continuous lines in FIG. 4 to FIG. 6) without using the single-acting actuator. It suffices that the single-acting actuator slowly moves the pusher plate 3.l, 3.r back into the parking position against the biasing force until the locking element again locks the pusher plate 3.l, 3.r.

In a further implementation a double-acting actuator pivots the or every or one assigned pusher plate 3.l, 3.r from the parking position into the engaging position as well as from the engaging position into the parking position. The double-acting actuator can be a hydraulic or an electric motor.

The implementation with the biasing element can be combined with that of the double-acting actuator. The pivotal movement into the engaging position is caused by the biasing element and the double-acting actuator.

In one embodiment the pusher plate 3.l, 3.r is pivoted over an angle of at least 90 degrees from the parking position into the engaging position. When the pusher plate 3.l, 3.r is in the parking position, the longitudinal axis of the lever arm 17.l, 17.r is perpendicular to the inlet longitudinal axis IA. Or the lever arm 17.l, 17.r is even pivoted further away from the wrapping material inlet In. When the pusher plate 3.l, 3.r is in the engaging position, the lever arm's longitudinal axis is parallel to the inlet longitudinal axis IA. Or the lever arm 17.l, 17.r is even further pivoted towards the wrapping material inlet In. The pusher plate 3.l, 3.r being in the final position may engage into the wrapping material inlet In.

The top views of FIG. 4 to FIG. 6 show two rollers 18.l, 18.r of a web width reducing device. The rotating axes of the rollers 18.*l*, 18.*r* are parallel to the plate pivoting axes PA.l, PA.r and perpendicular to the drawing planes of FIG. 4 to FIG. 6. These rollers 18.*l* and 18.*r* are in a position with the minimal distance to each other and shift together the web 8. The rollers 18.*l*, 18.*r* are moved into this width reducing position shortly before the web 8 is to be severed, i.e. when the required number of web layers is placed around the bale's circumferential surface C_B. The rollers 18.*l*, 18.*r* remain in this width reducing position while the new bale is formed and the clamped web 8 is not moved. The rollers 18.*l*, 18.*r* further remain in this position while the web 8 for wrapping the new bale is conveyed towards the wrapping material inlet In. The rollers 18.*l* and 18.*r* are moved away from each other as soon as the web 8 is injected into the bale forming chamber Ch and is clamped by the bale forming means and the rotated bale B.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

| LIST OF REFERENCE SIGNS | |
|---|---|
| 1 | wrapping material supply reel, carried by the axle 21 |
| 2.l, 2.r | left and right web pushers, comprise the left and right pusher plates 3.l, 3.r, the left and right lever arms 10.l, 10.r, and the drives 13.l, 13.r |
| 3.l, 3.r | left and right pusher plates, belong to the web pushers 2.l, 2.r, connected with the lever arms 17.1, 17.2, have the serrated front edges 10.l, 10.r |
| 4 | web feeding roller with ribs |
| 5 | pressing roller forming the upper border of the crop material inlet as well as the lower border of the wrapping material inlet In |
| 6 | further pressing roller, forms the lower border of the crop material inlet In |
| 7.1, . . . , 7.4 | parallel pressing belts, guided over the belt deflecting roller 15, belong to the bale forming means |
| 8 | web of wrapping material pulled from the supply reel 1, conveyed towards the wrapping material inlet In and injected through the wrapping material inlet In into the bale forming chamber Ch |
| 9.l, 9.r | left and right supporting axles for the lever arms 17.l, 17.r, extend along the pivoting axes PA.l, PA.r |
| 10.l, 10.r | serrated front edges of the pusher plates 3.l, 3.r, extend along the axes EA.l, EA.r |
| 11.l | idler pulling roller, biased against the driven pulling roller 11.d |
| 11.d | driven pulling roller, clamp the web 8 together with the idle roller 11.i |
| 12 | web conveying table, moveable in the directions D |
| 13.l, 13.r | left and right drives for pivoting the pusher plates 3.l, 3.r, belong to the web pushers 2.l, 2.r |
| 14 | retaining device positioned above the web conveying table 12, moved together with the web conveying table 12 |
| 15 | belt deflecting roller for the parallel pressing belts 7.1, . . . , 7.4 |
| 16.1, 16.2 | web deflecting rollers, positioned upstream of the web conveying table 12 and downstream of the supply reel 1 |
| 17.l, 17.r | left and right lever arms for the left and right pusher plates 3.l, 3.r, belong to the web pushers 2.l, 2.r, are connected with the axles 9.l, 9.r |
| 18.l, 18.r | left and right rollers of the width reducing device |
| 19 | conveying rotor, engages from above into the feeding channel |
| 20.l, 20.r | left and right lateral edges of the web 8 |
| 21 | axle carrying the supply reel 1 |
| B | round-cylindrical bale, has the circumferential surface C_B which is to be wrapped in the bale forming chamber Ch |
| C_B | circumferential surface of the round-cylindrical bale B, is to be wrapped |
| CD | direction in which the web 8 is conveyed |
| Ch | drum-shaped bale forming chamber in which the bale B is formed and wrapped |
| D | opposing directions in which the web conveying table 12 can be moved |
| EA.l, EA.r | longitudinal axis of the front edge 10.l, 10.r of the pusher plate 3.l, 3.r |
| FS | sagging lose front segment (leading segment) of the web 8 |
| IA | inlet longitudinal axis of the wrapping material inlet In |
| In | wrapping material inlet between the pressing roller 5 and the pressing belts 7.1, . . . , 7.4 through which the conveyed web 8 is injected into the bale forming chamber Ch, extends along the inlet longitudinal axis IA |
| PP.l, PP.r | plane in which the pusher plate 3.l, 3.r extends, coincides with the respective trajectory plane |
| PT.l, PT.r | pusher plate trajectories which the pusher plates 3.l, 3.r take when being pivoted from the parking position into the engaging position, are horizontal and perpendicular to the plate pivoting axes PA.l, PA.r and in the planes PP.l, PP.r |
| Rot | direction in which the bale B in the bale forming chamber Ch is rotated |
| TD | travelling direction of the round baler |

The invention claimed is:

1. Bale forming and wrapping apparatus comprising:
a bale forming apparatus providing a bale forming chamber and a wrapping material inlet guiding into the bale forming chamber;
a wrapping device positioned outside of the bale forming chamber, wherein the wrapping device comprises:
an unrolling station;
a wrapping material conveying device; and
at least one web pusher, wherein the at least one web pusher comprises:
a moveable pusher plate; and
a pusher plate drive for moving the moveable pusher plate,
wherein the moveable pusher plate is pivotal around a plate pivoting axis;
wherein the wrapping material inlet extends along an inlet longitudinal axis;
wherein the bale forming apparatus is arranged to form a bale in the bale forming chamber;
wherein the unrolling station is arranged to rotatably hold at least one reservoir of wrapping material;
wherein the wrapping material conveying device is arranged to convey a web of wrapping material taken from the reservoir towards the wrapping material inlet;
wherein the pusher plate drive for the moveable pusher plate is arranged to pivot the moveable pusher plate towards the wrapping material inlet around the plate pivoting axis; and
wherein the moveable pusher plate is arranged to hit the conveyed web, thereby pushing the hit web towards the wrapping material inlet;
wherein the plate pivoting axis of the moveable pusher plate is perpendicular to the inlet longitudinal axis;
wherein the wrapping device comprises a further web pusher with a further moveable pusher plate and a further pusher plate drive;
wherein the further moveable pusher plate is pivotal around a further plate pivoting axis being parallel to the plate pivoting axis; and
wherein the further pusher plate drive is arranged to pivot the further moveable pusher plate around the further plate pivoting axis towards the wrapping material inlet.

2. Bale forming and wrapping apparatus comprising:
a bale forming apparatus providing a bale forming chamber and a wrapping material inlet guiding into the bale forming chamber;
a wrapping device positioned outside of the bale forming chamber, wherein the wrapping device comprises:
an unrolling station;
a wrapping material conveying device; and
at least one web pusher, wherein the at least one web pusher comprises:
a moveable pusher plate; and
a pusher plate drive for moving the moveable pusher plate, wherein the moveable pusher plate is pivotal around a plate pivoting axis;
wherein the wrapping material inlet extends along an inlet longitudinal axis;
wherein the bale forming apparatus is arranged to form a bale in the bale forming chamber;
wherein the unrolling station is arranged to rotatably hold at least one reservoir of wrapping material;
wherein the wrapping material conveying device is arranged to convey a web of wrapping material taken from the reservoir towards the wrapping material inlet;
wherein the pusher plate drive for the moveable pusher plate is arranged to pivot the moveable pusher plate towards the wrapping material inlet around the plate pivoting axis; and
wherein the moveable pusher plate is arranged to hit the conveyed web, thereby pushing the hit web towards the wrapping material inlet;
wherein the plate pivoting axis of the moveable pusher plate is perpendicular to the inlet longitudinal axis;
wherein the wrapping device comprises a further web pusher with a further moveable pusher plate and a further pusher plate drive;
wherein the further moveable pusher plate is linearly moveable with respect to the wrapping material inlet; and
wherein the further pusher plate drive is arranged to linearly move the further moveable pusher plate towards the wrapping material inlet.

3. Bale forming and wrapping apparatus comprising:
a bale forming apparatus providing a bale forming chamber and a wrapping material inlet guiding into the bale forming chamber;
a wrapping device positioned outside of the bale forming chamber, wherein the wrapping device comprises:
an unrolling station;
a wrapping material conveying device; and
at least one web pusher, wherein the at least one web pusher comprises:
a moveable pusher plate; and
a pusher plate drive for moving the moveable pusher plate, wherein the moveable pusher plate is pivotal around a plate pivoting axis;
wherein the wrapping material inlet extends along an inlet longitudinal axis;
wherein the bale forming apparatus is arranged to form a bale in the bale forming chamber;
wherein the unrolling station is arranged to rotatably hold at least one reservoir of wrapping material;
wherein the wrapping material conveying device is arranged to convey a web of wrapping material taken from the reservoir towards the wrapping material inlet;
wherein the pusher plate drive for the moveable pusher plate is arranged to pivot the moveable pusher plate towards the wrapping material inlet around the plate pivoting axis; and
wherein the moveable pusher plate is arranged to hit the conveyed web, thereby pushing the hit web towards the wrapping material inlet;
wherein the plate pivoting axis of the moveable pusher plate is perpendicular to the inlet longitudinal axis;
wherein the wrapping device comprises a width reducing device, wherein the width reducing device is arranged to reduce at least temporarily the width of the web; and
wherein the moveable pusher plate is pivotal between a parking position and a final position closest to the bale forming chamber and is positioned between the wrapping material inlet and the width reducing device at least when being in the final position.

4. Method for forming and wrapping at least one bale, wherein the method is performed by using a bale forming and wrapping apparatus comprising:
a bale forming apparatus providing a bale forming chamber and a wrapping material inlet guiding into the bale forming chamber; and
a wrapping device positioned outside of the bale forming chamber, wherein the wrapping device comprises:
an unrolling station;
a wrapping material conveying device; and
at least one web pusher, wherein the at least one web web pusher comprises:

a moveable pusher plate; and a pusher plate drive for the moveable pusher plate;

wherein the wrapping material inlet extends along an inlet longitudinal axis;

wherein the moveable pusher plate is pivotal around a plate pivoting axis; and wherein the method comprises the steps that:

the bale forming apparatus forms the bale in the bale forming chamber;

the unrolling station rotatably holds at least one reservoir of wrapping material;

a web of wrapping material is taken from the reservoir and is conveyed towards the wrapping material inlet by the wrapping material conveying device;

the pusher plate drive for the moveable pusher plate pivots the moveable pusher plate around the plate pivoting axis towards the wrapping material inlet so the pivoted moveable pusher plate hits the web;

the conveyed web is pushed towards the wrapping material inlet when being hit by the moveable pusher plate; and wherein the step that the pusher plate drive pivots the moveable pusher plate is performed such that the plate pivoting axis of the moveable pusher plate is perpendicular to the inlet longitudinal axis;

wherein the wrapping device comprises a further web pusher with a further moveable pusher plate and a further pusher plate drive; and wherein the further pusher plate is pivotal around a further plate pivoting axis being parallel to the plate pivoting axis; and wherein the step that the conveyed web is pushed comprises the further step that the further pusher plate drive pivots the further moveable pusher plate around the further plate pivoting axis towards the wrapping material inlet such that the further moveable pusher plate hits and pushes the web.

\* \* \* \* \*